US012475831B2

(12) United States Patent
Kim

(10) Patent No.: US 12,475,831 B2
(45) Date of Patent: Nov. 18, 2025

(54) DISPLAY DEVICE

(71) Applicant: LG DISPLAY CO., LTD., Seoul (KR)

(72) Inventor: Minki Kim, Gyeonggi-do (KR)

(73) Assignee: LG Display Co., Ltd (KR)

( * ) Notice: Subject to any disclaimer, the term of this patent is extended or adjusted under 35 U.S.C. 154(b) by 112 days.

(21) Appl. No.: 18/378,956

(22) Filed: Oct. 11, 2023

(65) Prior Publication Data

US 2024/0221594 A1 Jul. 4, 2024

(30) Foreign Application Priority Data

Dec. 29, 2022 (KR) ........................ 10-2022-0188085

(51) Int. Cl.
*G09G 3/20* (2006.01)
*G09G 3/36* (2006.01)

(52) U.S. Cl.
CPC ......... *G09G 3/2096* (2013.01); *G09G 3/2007* (2013.01); *G09G 3/3688* (2013.01); *G09G 2310/0275* (2013.01); *G09G 2310/0291* (2013.01); *G09G 2330/021* (2013.01); *G09G 2370/10* (2013.01)

(58) Field of Classification Search
CPC .. G09G 3/2096; G09G 3/2007; G09G 3/3688; G09G 2310/0275; G09G 2310/0291; G09G 2330/021; G09G 2370/10
See application file for complete search history.

(56) References Cited

U.S. PATENT DOCUMENTS 9,311,206 B2 * 4/2016 Culshaw .............. G11C 29/022
9,417,682 B2 * 8/2016 Nakayama ........... G09G 3/3685
9,417,683 B2 * 8/2016 Nakayama ........... G09G 3/3688
10,297,232 B2 * 5/2019 Oh ........................... G09G 5/18
10,438,553 B2 * 10/2019 Kuei .................... G09G 3/3688
10,650,761 B2 * 5/2020 Lee ...................... G09G 3/3614
11,195,465 B2 * 12/2021 Lee ...................... G09G 3/3283
11,620,011 B2 * 4/2023 Park ......................... G09G 3/20 345/174
2011/0193851 A1 * 8/2011 Lu .......................... G09G 3/344 345/107
2015/0138254 A1 * 5/2015 Nakayama ............ G06F 1/3265 345/690

(Continued)

FOREIGN PATENT DOCUMENTS

KR 10-2016-0040804 A 4/2016

*Primary Examiner* — Michael J Jansen, II
(74) *Attorney, Agent, or Firm* — Fish & Richardson P.C.

(57) ABSTRACT

A display device A display device includes a display panel including a plurality of pixel rows and a plurality of pixel columns arranged to display an image; a data driver comprising a plurality of source drive integrated circuits (ICs) respectively connected to one or more pixel columns among the plurality of pixel columns and configured to supply a data signal to the plurality of pixel rows; and a timing controller configured to supply image data and a data control signal to the data driver, wherein the timing controller includes a general purpose input-output (GPIO) pin connected to digital block power down enable (DBDEN) pins provided in each of the plurality of source drive ICs in a point-to-multipoint way and outputs a DBDEN signal disabling to at least some of the plurality of source drive ICs.

18 Claims, 8 Drawing Sheets

(56) References Cited

U.S. PATENT DOCUMENTS

| | | | | |
|---|---|---|---|---|
| 2015/0138259 | A1* | 5/2015 | Nakayama | G09G 3/3685 345/691 |
| 2015/0138261 | A1* | 5/2015 | Nakayama | G09G 3/2092 345/694 |
| 2015/0255042 | A1* | 9/2015 | Oh | G09G 5/18 345/212 |
| 2015/0293829 | A1* | 10/2015 | Culshaw | G06F 11/3027 714/733 |
| 2018/0374443 | A1* | 12/2018 | Kuei | G09G 3/3611 |
| 2019/0122623 | A1* | 4/2019 | Lee | G09G 3/3614 |
| 2020/0219450 | A1* | 7/2020 | Lee | G09G 3/3275 |
| 2022/0011895 | A1* | 1/2022 | Park | G06F 3/04184 |

* cited by examiner

DISPLAY DEVICE

CROSS-REFERENCE TO RELATED APPLICATION

The present application claims the priority of Korean Patent Application No. 10-2022-0188085, filed on Dec. 29, 2022, which is hereby incorporated by reference in its entirety.

BACKGROUND

Field of the Disclosure

The present disclosure relates to a display device.

Description of the Background

Display devices include a liquid crystal display device (LCD), an electroluminescence display, a field emission display (FED), and a quantum dot display panel (QD), etc. The electroluminescence display devices may be classified into an inorganic light-emitting display device and an organic light emitting display device according to materials of a light emitting layer.

Among these display devices, low-power transmission driving (LPTD) has been developed as a method of reducing power consumption. Under the enabled LPTD, the source drive integrated circuit (IC) stores image data in built-in memory when two or more rows of pixels display the same image in an area driven by the source drive IC. The source drive IC may periodically read image data stored in a frame buffer and transmit the image data to a display panel. While the rows of the pixels continue to display the same image, the image data is not transmitted from a timing controller to the source drive IC. Therefore, power consumption in the timing controller is reduced during the LPTD.

SUMMARY

Accordingly, the present disclosure is directed to a display device that substantially obviates one or more of problems due to limitations and disadvantages described above.

More specifically, the present disclosure is to provide a display device that can reduces power consumption.

In addition, the present disclosure is to provide a display device that can further reduce power consumption by disabling a digital circuit of a source drive integrated circuit (IC) in a low power transmission driving (LPTD) mode.

Further, the present disclosure is to provide a display device that transmits a control signal for LPTD through a single output pin.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a display panel including a plurality of pixel rows and a plurality of pixel columns arranged to display an image; a data driver including a plurality of source drive integrated circuits (ICs) respectively connected to one or more pixel columns and configured to supply a data signal to the pixel rows; and a timing controller configured to supply image data and a data control signal to the data driver.

The timing controller may include a general purpose input-output (GPIO) pin connected point-to-multipoint to digital block power down enable (DBDEN) pins respectively provided in the plurality of source drive ICs and configured to output a DBDEN signal for disabling at least some of the plurality of source drive ICs.

The timing controller may be configured to transmit a control packet for indicating whether to disable the source drive ICs through an interface wiring pair connected to the data driver when the DBDEN signal is enabled.

Each of the plurality of source drive ICs may be selectively disabled based on 2-bit pseudo-control data included in the control packet and the DBDEN signal.

Each of the plurality of source drive IC may include a receiver connected to the interface wiring pair and receiving the control packet and a data packet; a logic unit configured to process the control packet and the data packet; and a logic gate connected to the DBDEN pin and an output of the logic unit, and configured to operate and output a DBDEN signal and an output signal of the logic unit to the receiver.

The logic unit may be configured to output a logic high signal to stop operating the receiver when the control packet indicates disability.

The logic gate may output a logic high signal when the DBDEN signal of a logical high-level is supplied to the DBDEN pin and the logic high signal is output from the logic unit.

The receiver may include an operational amplifier configured to receive an output of the logic gate as a driving voltage, and amplify and output an input signal of the interface wiring pair.

The operational amplifier may be disabled and stop the output when the logic high signal is received from the logic gate.

The logic unit may include a digital circuit configured to perform a digital logic function required for driving the display panel; and an analog circuit configured to generate an analog output based on an output of the digital circuit.

The logic unit may disable the digital circuit when the control packet indicates the disability.

The timing controller may be configured to disable the source drive IC connected to the pixel column including two or more pixel rows by outputting the DBDEN signal to the plurality of source drive ICs, when the two or more pixel rows display the same grayscale.

The timing controller may be configured to transmit a control packet indicating disability to the source drive IC connected to the pixel column including the two or more pixel rows through the interface wiring pair.

In another aspect of the present disclosure, a display device includes a display panel including a plurality of pixel rows and a plurality of pixel columns arranged to display an image; a plurality of source drive ICs respectively connected to one or more pixel columns and configured to supply a data signal to the pixel rows; and a timing controller configured to disable at least one source drive ICs connected to two or more pixel rows when the two or more pixel rows display one grayscale.

The timing controller may transmit a control packet indicating the at least one source drive ICs to be disabled and a digital block power down enable (DBDEN) signal to the plurality of source drive ICs when the at least one source drive ICs is disabled.

The control packet may include 2-bit pseudo-control data indicating whether to disable each of the plurality of source drive ICs.

The control packet may include a value of '11' for the at least one source drive IC to be disabled, and a value of '00' for the other source drive ICs.

The disability of the plurality of source drive ICs may be determined based on the pseudo control data included in the control packet, when the DBDEN signal is received.

The plurality of source drive ICs may include: a digital circuit configured to perform a digital logic function required for driving the display panel; and an analog circuit configured to generate an analog output based on an output of the digital circuit, the digital circuit being disabled based on the control data.

The timing controller may be connected to each of the plurality of source drive ICs through an interface wiring pair, and the timing controller may be connected point-to-multi-point to DBDEN pins respectively provided in the plurality of source drive ICs through a GPIO pin.

The DBDEN signal may be output through the GPIO pin, and the control packet is output through the interface wiring pair.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Below, aspects will be described with reference to the accompanying drawings. In this disclosure, when a certain element (or area, layer, portion, etc.) is referred to as being "on," "connected to," or "coupled to" another element, it may be directly on, connected to, or coupled to the other element, or a third element may be intervened therebetween.

Like numerals refer to like elements. Further, in the accompanying drawings, the thicknesses, proportions, and dimensions of the elements area exaggerated for effective technical description. The term "and/or" includes any of one or more combinations that may be defined by associated elements.

Although the terms first, second, etc. may be used herein to describe various elements, these elements are not limited by these terms. These terms are only used to distinguish one element from another element. For example, a first element may be termed a second element, and, similarly, a second element may also be termed a first element, without departing from the scope of the disclosure. The singular forms are intended to include the plural forms as well unless the context clearly indicates otherwise.

The terms "beneath," "below," "above," "upper" and the like are used for describing a relationship between the elements shown in the accompanying drawings. These terms are relative, and described with reference to the orientation shown in the accompanying drawings.

It should be understood that the terms "include" or "have" are merely intended to indicate that the features, numbers, steps, operations, elements, components, or combinations thereof are present, and are not intended to exclude a possibility that one or more other features, numbers, steps, operations, elements, components, or combinations thereof will be present or added.

Figure 1:
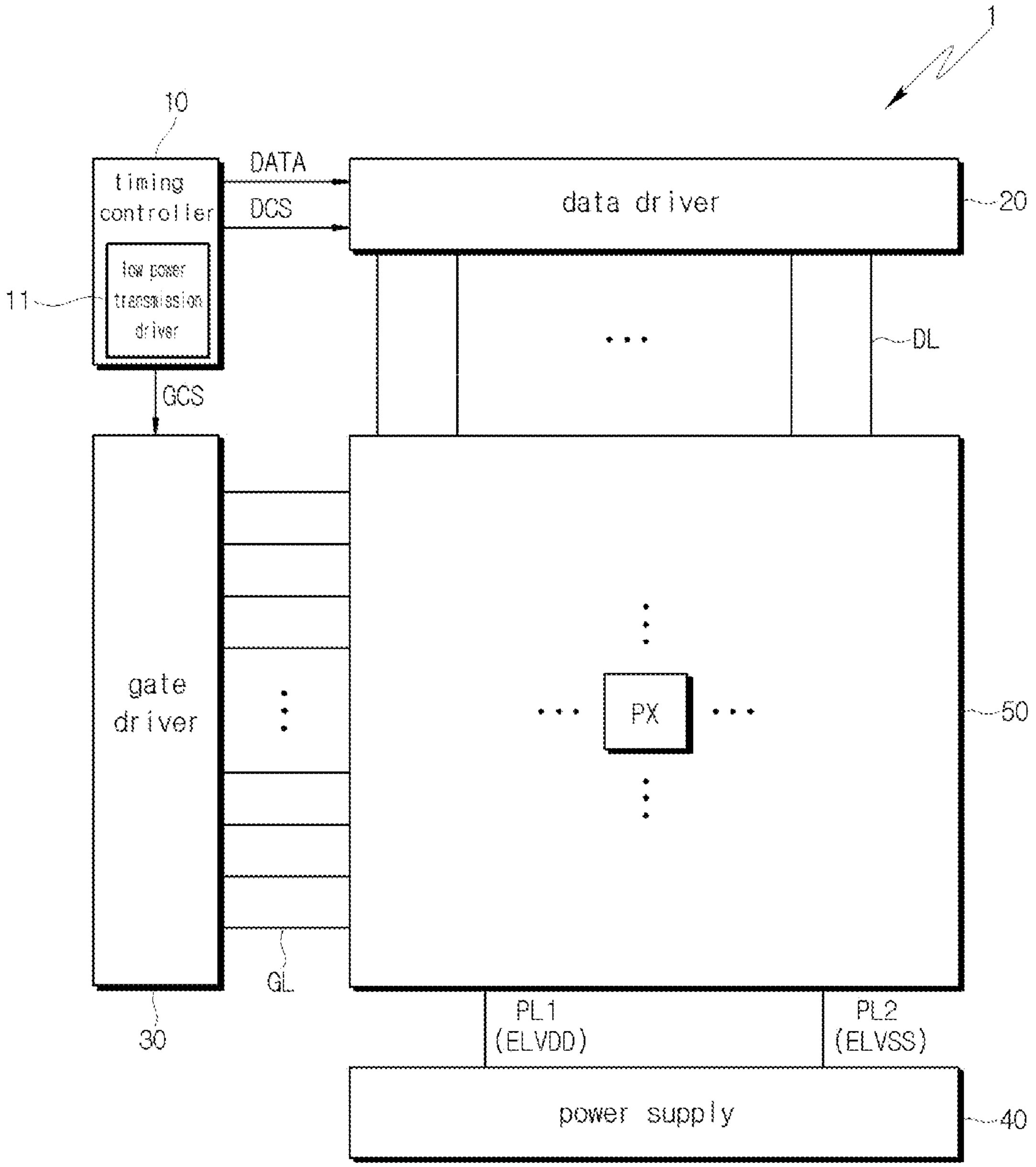
FIG. 1 is a block diagram of a display device according to an aspect of the present disclosure.

FIG. 1 is a block diagram of a display device according to an aspect of the present disclosure.

Referring to FIG. 1, a display device 1 includes a timing controller 10, a data driver 20, a gate driver 30, a power supply 40, and a display panel 50.

The timing controller 10 generates a data control signal DCS and a gate control signal GCS by receiving a timing signal and image data from an external system (e.g., host). The timing signal may include a data enable signal, a horizontal sync signal, a vertical sync signal, a main clock, etc.

The gate control signal GCS may include a gate start pulse, a gate shift clock, a gate output enable signal, and the like scan timing control signal. The data control signal DCS may include a data timing control signal, such as a source sampling clock, a polarity control signal, and a source output enable signal.

The timing controller 10 may be disposed on a control printed circuit board connected to a source printed circuit board by a connection medium such as a flexible flat cable (FFC) and a flexible printed circuit (FPC), in which the source printed circuit board includes the data driver 20 boned thereto. For example, the timing controller 10 may connected to the data driver 20 through an embedded clock point-to-point interface (EPI) wiring pair.

The data driver 20 converts digital image data DATA received from the timing controller 10 through the EPI wiring pair into an analog data signal based on the data control signal DCS. The data driver 20 may apply the analog data signal to corresponding pixels PX through a data line DL.

The data driver 20 may include a source drive circuit or a source drive IC. The data driver 20 may be connected to a bonding pad of the display panel 50 by a tape-automated-bonding (TAB) method or a chip-on-glass (COG) method, or may be directly disposed on the display panel 50. In some cases, the data driver 20 may be integrated and disposed on the display panel 50.

The gate driver 30 may sequentially output gate voltages by one horizontal period through the gate line GL in response to the gate control signal GCS received from the timing controller 10. Thus, a pixel row connected to each gate line GL is turned on by one horizontal period. During one horizontal period, the data signal may be applied to the pixel row turned on by the gate line GL.

The gate driver 30 may include stage circuits respectively connected to a plurality of gate line GL, and may be configured as a gate in panel (GIP) mounted to the display panel 50 as shown. Such a gate driver 30 may include a shift register, a level shifter, etc.

The power supply 40 converts an external input voltage into a high potential voltage ELVDD and a low potential voltage ELVSS as standard voltages to be used in internal components of the display device 1, and outputs the high potential voltage ELVDD and the low potential voltage ELVSS to the internal components through the power lines PL1 and PL2. The power supply 40 may be disposed on the control printed circuit board on which the timing controller 10 is disposed. The power supply 40 may also be referred to as a power management integrated circuit (PMIC).

On the display panel 50, a plurality of pixels PX (or subpixels) are disposed. For example, the pixels PX may be arranged as a matrix on the display panel 50. The pixels PX disposed in a one-pixel row are connected to the same gate line GL, and the pixels PX disposed in one pixel column are connected to the same data line DL. The pixels PX may emit light with a brightness level corresponding to a data signal supplied through the data lines DL.

According to an aspect, each pixel PX may display any one of the colors among red, green and blue. According to another aspect, each pixel PX may display any one of the colors among cyan, magenta, and yellow. According to an alternative aspect, each pixel PX may display any one of colors among red, green, blue and white.

The timing controller 10, the data driver 20, the gate driver 30, and the power supply 40 may be respectively configured as individual ICs, or at least some of the timing controller 10, the data driver 20, the gate driver 30, and the power supply 40 may be integrated as an IC.

According to an aspect of the present disclosure, the display device 1 may be configured to operate in a low-power transmission driving (LPTD) mode. In this aspect, the timing controller 10 may include a low power transmission driver 11. The low power transmission driver 11 may detect whether predetermined pixel rows of the display panel 50 display the same grayscale, based on the image data received from the external host. When predetermined pixel rows display the same grayscale, the low power transmission driver 11 may transmit the image data to the data driver 20 for the start (first) pixel row among the predetermined pixel rows and stop transmitting the image data to the data driver 20 for a period corresponding to the other pixel rows, thereby reducing power consumption. According to an aspect of the present disclosure, the low power transmission driver 11 may disable the digital circuits of the data driver 20, to which the image data is not being transmitted, thereby further reducing the power consumption.

Below, the LPTD will be described in more detail.

Figure 2:
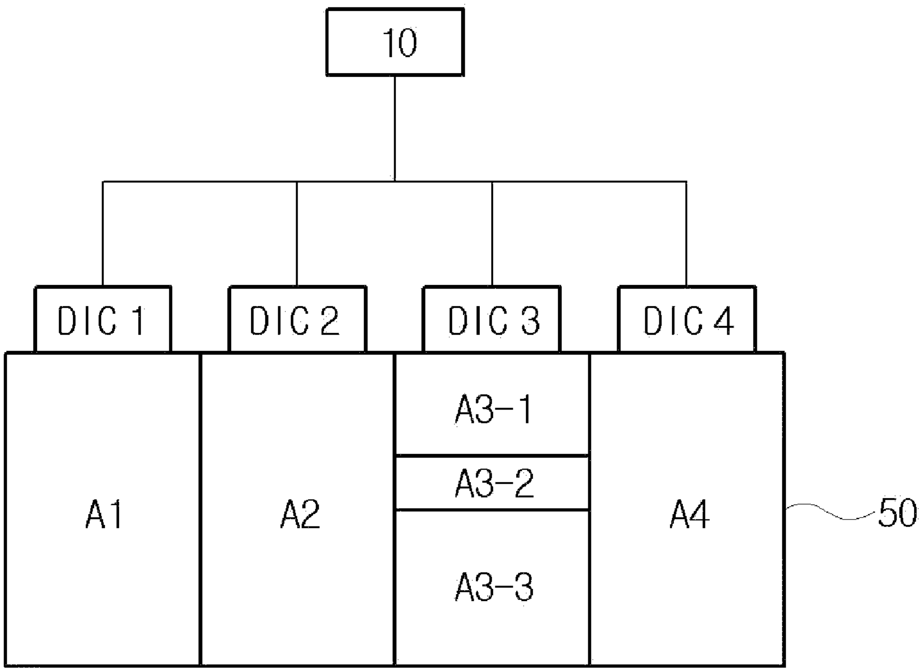
FIG. 2 shows an example of implementing a display device according to an aspect of the present disclosure.

FIG. 2 shows an example of implementing a display device according to an aspect of the present disclosure.

Referring to FIG. 2, the data driver 20 (shown in FIG. 1) may include one or more source drive ICs DIC1 to DIC4. The timing controller 10 may be connected to each of the source drive ICs DIC1 to DIC4 by an individual line. In this aspect, the data driver 20 includes four source drive ICs DIC1 to DIC4, but is not limited thereto.

Each of the source drive ICs DIC1 to DIC4 may include a register, a latch, a digital-to-analog converter, an output buffer, etc. Each of the source drive ICs DIC1 to DIC4 may receive a data control signal DCS (shown in FIG. 1) from the timing controller 10, and generate a data signal based on the data control signal DCS. The source drive ICs DIC1 to DIC4 are respectively connected to the corresponding data lines DL (shown in FIG. 1) to supply the data signal. The number of source drive ICs DIC1 to DIC4 may be varied depending on the size, resolution, etc. of the display panel 50.

Each of the source drive ICs DIC1 to DIC4 may be connected to the display panel 50 by a TAB, may be connected to a bonding pad of the display panel 50 by a COG or chip-on-panel method, or may be connected to the display panel 50 as implemented by a chip-on-film method. In this case, each of the source drive ICs DIC1 to DIC4 may be mounted on a circuit film connected to the display panel 50.

The display panel 50 may include a plurality of display areas A1 to A4 respectively connected to the source drive ICs DIC1 to DIC4. Each of the display areas A1 to A4 may output an image based on a data signal output from each of the source drive ICs DIC1 to DIC4.

According to an aspect of the present disclosure, the display device 1 may operate in the LPTD mode. For example, a 3-1st area A3-1 of the display panel 50 may display an image of various grayscales, and a 3-2nd area A3-2 of the display panel 50 may display an image of the same grayscale. The timing controller 10 transmits image data of the start (first) pixel row in the 3-2nd area A3-2 to a third source drive IC DIC3 corresponding to that area A3-2, and then stops transmission to the third source drive IC DIC3 for a horizontal period during which the image data is to be transmitted to the other pixel rows of the 3-2nd area A3-2, thereby operating with low power.

While the transmission is stopped, the third source drive IC DIC3 may store the image data of the start (first) pixel row in a built-in memory (or channel input buffer), and repeatedly output the stored image data to the other pixel rows.

Thereafter, when image data of the 3-3rd area A3-3 for displaying an image having a grayscale different from that of the 3-2nd area A3-2 is received from a host, the timing controller 10 outputs a clock training pattern and wakes up the third source drive IC DIC3 for a horizontal period during which the image data is transmitted to the last pixel row of the 3-2nd area A3-2. Therefore, the third source drive IC DIC3 may correctly receive image data at a time when the data signal of the 3-3rd area A3-3 is to be transmitted.

Figure 3:
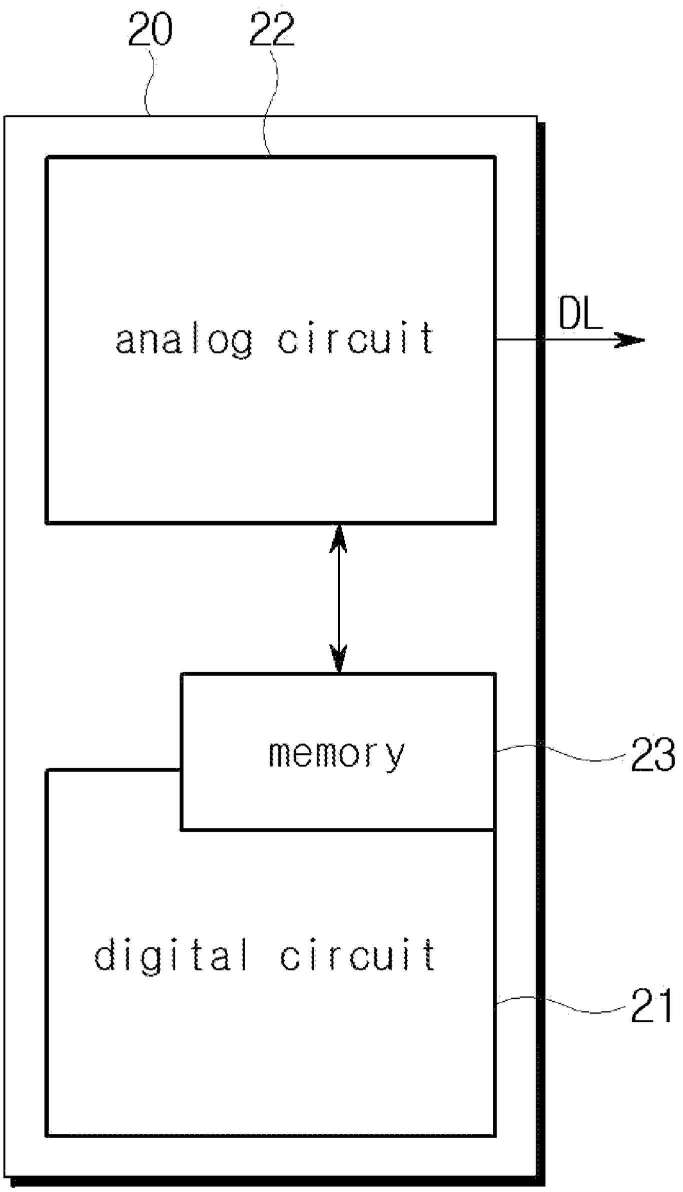
FIG. 3 is a block diagram schematically showing a configuration of a source drive integrated chip (IC) according to an aspect of the present disclosure.

FIG. 3 is a block diagram schematically showing a configuration of a source drive IC according to an aspect of the present disclosure.

Referring to FIG. 3, a data drive IC DIC according to an aspect may include a digital circuit 21 that performs a digital logic function (control of an internal memory 23, operations, etc.) required to drive the display panel 50, and an analog circuit 22 that generates an analog output based on the output of the digital circuit 21.

The digital circuit 21 may enable the digital logic function to transmit information about an analog output target value to the analog circuit 22. The analog circuit 22 may generate an analog output based on the analog output target value, and output the analog output to the data line DL or the like.

Figure 4:
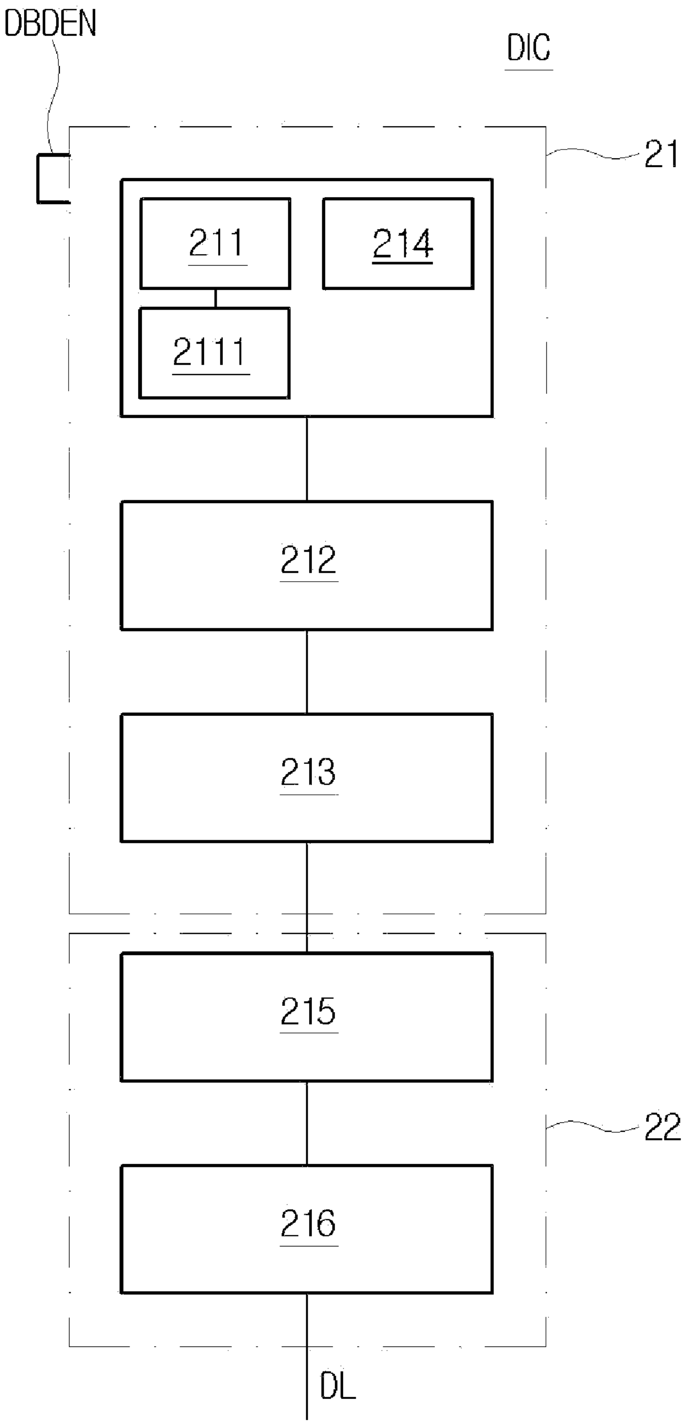
FIG. 4 is a block diagram more specifically showing the configuration of the source drive IC shown in FIG. 3.

FIG. 4 is a block diagram more specifically showing the configuration of the source drive IC shown in FIG. 3.

Referring to FIG. 4, the source drive IC DIC according to an aspect may be configured as a logic unit that includes a register 212, a latch 213, a digital-to-analog converter 215, an output buffer 216, etc. Such logic units may be classified into the digital circuit 21, which receives and stores image data as a digital signal, and the analog circuit 22, which converts the image data into an analog data signal and outputs the analog data signal.

The digital circuit 21 may include a receiver 211, the register 212, and the latch 213.

The receiver 211 may be connected to the timing controller 10 through an EPI wiring pair. The receiver 211 receives a packet from the timing controller 10 through the EPI wiring pair. The receiver 211 connects with a serial-to-parallel converter 2111, and converts a digital packet serially received through the EPI wiring pair into a parallel packet.

The register 212 may control the timing at which the image data is sequentially stored in the latch 213. The register 212 may sequentially shift vertical sync start signals, and provide the shifted clock signals to the latch 213.

The latch 213 latches the image data as much as one pixel row based on the clock signals output from the register 212, and sequentially outputs the image data in response to a source output enable signal.

According to an aspect, the receiver 211 may further include a clock recovering unit 214 for clock and data recovery (CDR). The clock recovering unit 214 may recover the clock signal corresponding to the clock training pattern output from the timing controller 10, and output a lock signal when the CDR is stabilized by recovery completion. When the lock signal is output, the data control signal DCS and the image data may be transmitted from the timing controller 10 to the source drive IC DIC.

The analog circuit 22 may include a digital-to-analog converter 215, and an output buffer 216.

The digital-to-analog converter 215 generates a data signal by converting the image data output from the latch 214 into a gamma-correction voltage.

The output buffer 216 outputs the data signal from the digital-to-analog converter 215 to the data line DL.

The source drive IC DIC may further include a digital block power down enable (DBDEN) pin. The DBDEN pin is connected to the timing controller 10, and configured to receive a DBDEN signal. When the DBDEN signal having a predetermined level is received through the DBDEN pin, the receiver 211 of the source drive IC DIC may stop operating, and the digital circuit 21 is disabled, thereby reducing power consumption. Below, it will be described that the source drive IC DIC is controlled to be disabled when the DBDEN signal is at a logical high-level, but this aspect is not limited thereto.

Figure 5:
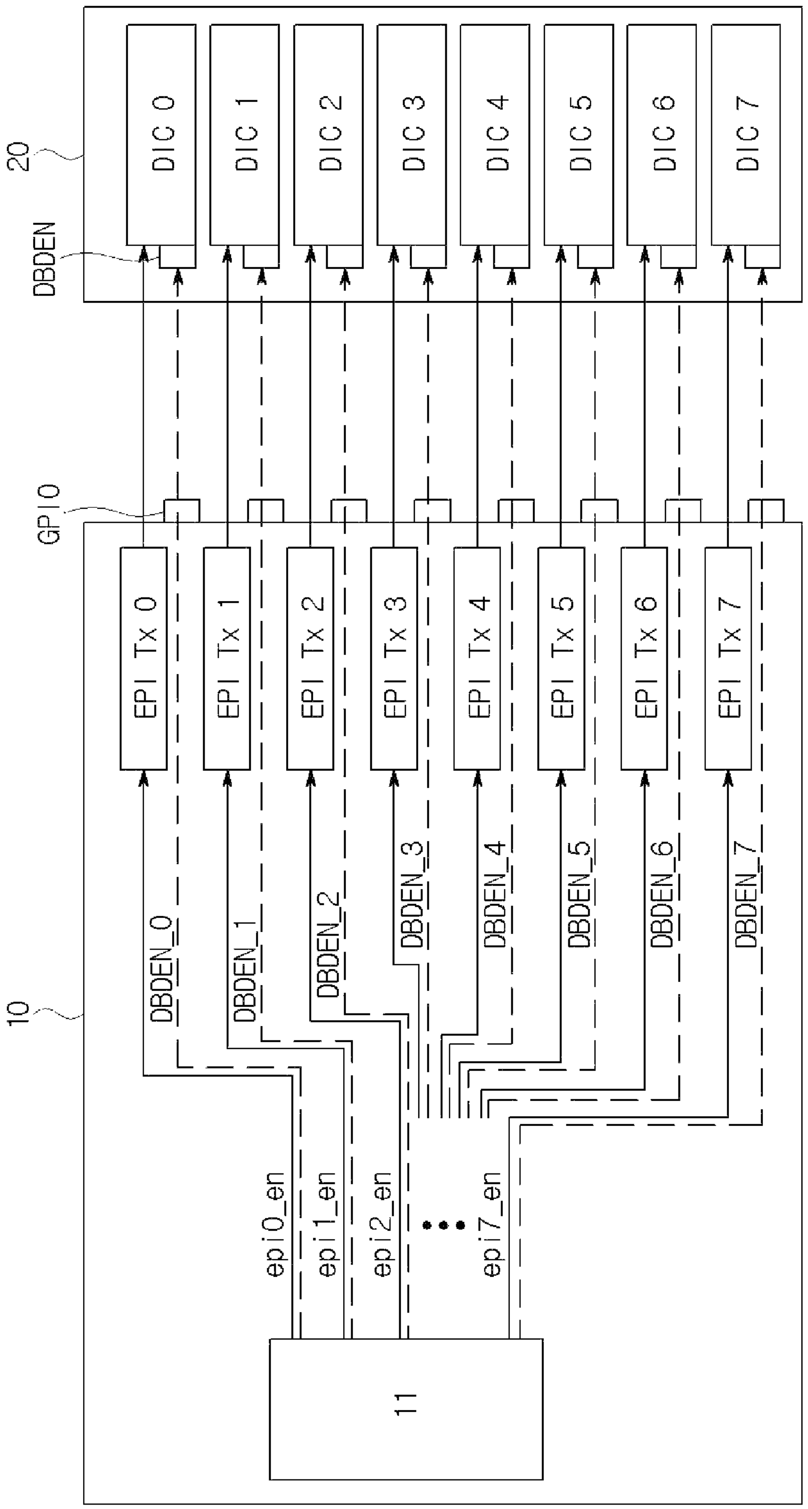
FIG. 5 illustrates an interface between a timing controller and a source drive IC according to an aspect of the present disclosure.

FIG. 5 illustrates an interface between a timing controller and a source drive IC according to an aspect of the present disclosure.

Referring to FIG. 5, the data driver 20 according to an aspect may include a predetermined number of source drive ICs, for example, eight source drive ICs DIC 0 to DIC 7.

The timing controller 10 (for example, the low power transmission driver 11) and the data driver 20 may be connected by a wiring pair based on a panel internal interface such as the EPI. The timing controller 10 may include transmitters EPI Tx 0 to EPI Tx 7 corresponding to the source drive ICs DIC 0 to DIC 7. Each of the transmitters EPI Tx 0 to EPI Tx 7 may be connected to one of the source drive ICs DIC 0 to DIC 7 by the EPI wiring. In other words, the timing controller 10 and the source drive ICs DIC 0 to DIC 7 are connected in a one-to-one, i.e., point-to-point form by the EPI wiring pair.

The timing controller 10 may convert the data control signal and the image data into serial data and distribute the serial data to the transmitters EPI Tx 0 to EPI Tx 7. The source drive ICs DIC 0 to DIC 7 receives the timing control signal and the image data from the timing controller 10 through the EPI wiring pair. Specifically, the source drive ICs DIC 0 to DIC 7 may receive data packets including 8-bit image data for each channel, control packets including 2-bit pseudo control data, etc.

In the LPTD mode, when image data to be displayed in a predetermined area, received from the host, has the same grayscale, the timing controller 10 may detect that the image data has the same grayscale, transmit the image data to be applied to the source drive ICs DIC 0 to DIC 7 connected to that area only once, and stop the transmission to those source drive ICs DIC 0 to DIC 7 (EPI Tx OFF). In this aspect, the transmission to the other source drive ICs DIC 0 to DIC 7 may be maintained (EPI Tx ON). In this way, the source drive ICs DIC 0 to DIC 7 may be driven independently of each other in the LPTD mode (split driving).

According to an aspect, the timing controller 10 disables the digital circuit 22 (shown in FIG. 3) of the source drive ICs DIC 0 to DIC 7 to which the image data is not transmitted, thereby further reducing the power consumption. To this end, the timing controller 10 (for example, the low power transmission driver 11) may further include a general purpose input-output (GPIO) pin electrically connected to the source drive ICs DIC 0 to DIC 7. According to an aspect, there may be as many GPIO pins as the number of source drive ICs DIC 0 to DIC 7. The GPIO pins may be connected one-to-one to the DBDEN pins respectively provided in the source drive ICs DIC 0 to DIC 7.

When packet transmission to predetermined source drive ICs DIC 0 to DIC 7 is stopped, the timing controller 10 may output a DBDEN signal having a logical high-level through the GPIO pins connected to those source drive ICs DIC 0 to DIC 7. The source drive ICs DIC 0 to DIC 7 may temporarily stop driving the digital circuit 21 in response to the DBDEN signal received through the DBDEN pin, and thus operate in a sleep mode (i.e., power-down mode).

While the digital circuit 21 stops operating, the analog circuit 22 (shown in FIG. 3) may generate an analog data signal by reading the image data stored in the memory 23 (shown in FIG. 3) prior to the transmission stop, and output the analog data signal to the data line DL. The source drive ICs DIC 0 to DIC 7 may remain in the sleep mode until the clock training pattern is input through the EPI wiring pair, and wake up in response to the input of the clock training pattern.

In this aspect, the timing controller 10 includes as many GPIO pins as the number of source drive ICs DIC 0 to DIC 7, and is connected one-to-one to the DBDEN pins provided in the source drive ICs DIC 0 to DIC 7 through the GPIO pins. With this structure, the timing controller 10 may control each power-down timing of the source drive ICs DIC 0 to DIC 7 in real time and independently.

Figure 6:
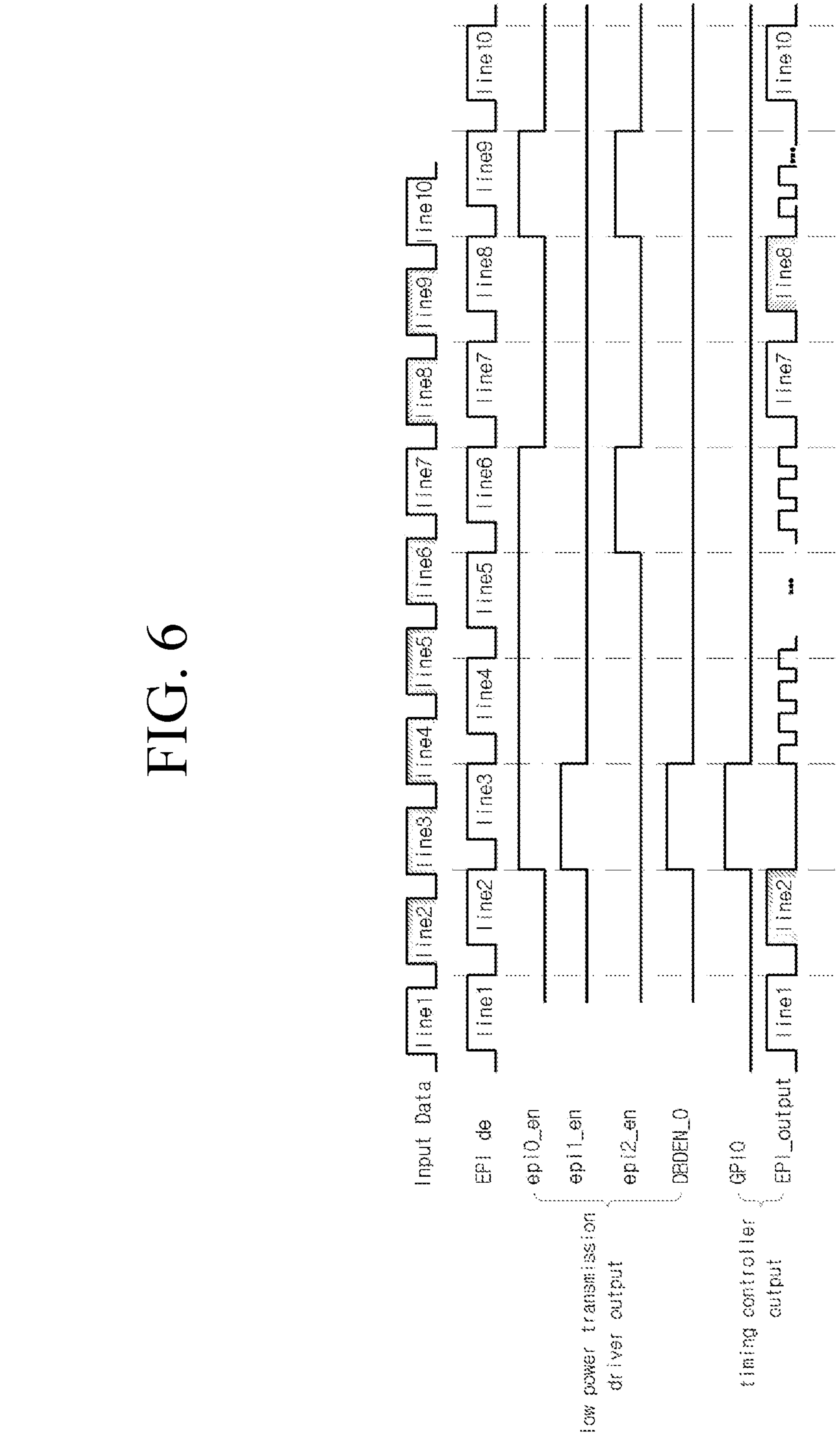
FIG. 6 is a timing diagram of signals generated by a timing controller and a source drive IC according to an aspect of the present disclosure.

FIG. 6 is a timing diagram of signals generated by a timing controller and a source drive IC according to an aspect of the present disclosure.

Referring to FIG. 6 in conjunction with FIG. 5, the timing controller 10 may include the low power transmission driver 11 and the transmitters EPI Tx 0 to EPI Tx 7 connected to the low power transmission driver 11.

The low power transmission driver 11 may generate line pulses epi0_en to epi7_en corresponding to the source drive ICs DIC 0 to DIC 7 in sync with a data enable signal EPI de indicating a point in time when the source drive IC DIC is to output the image data of each pixel row. The low power transmission driver 11 may output the generated line pulses epi0_en to epi7_en to the respective transmitters EPI Tx 0 to EPI Tx 7. According to an aspect, the line pulses epi0_en to epi7_en refer to signals for enabling the transceiving for those source drive ICs DIC 0 to DIC 7, and may indicate the transceiving to be enabled at a logical low-level but disabled at a logical high-level.

When the line pulses epi0_en to epi7_en generated by the low power transmission driver 11 indicate the transceiving to be enabled, the transmitters EPI Tx 0 to EPI Tx 7 may output the data packet through the EPI wiring pair (EPI-_output). According to an aspect, control packets or the like may be additionally transmitted along with the data packets. The output data packets may be transmitted to the receivers of the source drive ICs DIC 0 to DIC 7 connected to the EPI wiring pair.

Meanwhile, the low power transmission driver 11 may generate DBDEN signals DBDEN_0 to DBDEN_7 to disable each digital block 22 (shown in FIG. 4) of the source drive ICs DIC 0 to DIC 7. The low power transmission driver 11 may output the DBDEN signals DBDEN_0 to DBDEN_7 to the respective GPIO pins.

The output signal of the GPIO pin may be controlled by the DBDEN signals DBDEN_0 to DBDEN_7 generated by the low power transmission driver 11 (GPIO). The output GPIO signals may be transmitted to the DBDEN pins of the source drive ICs DIC 0 to DIC 7, respectively.

In the shown aspect, the timing controller 10 may receive image data for the pixel rows line1 to linel0 connected to the first source drive IC DIC 0 responsible for supplying the data signal to predetermined pixel columns (Input Data). According to an aspect, the image data for the second to sixth pixel rows line2 to line6 may have the same grayscale, and the image data for the eighth and ninth pixel rows line8 and line9 may have the same grayscale.

In this aspect, the timing controller 10 may operate in the LPTD mode with respect to the pixel rows displaying an image of the same grayscale. The low power transmission driver 11 may control the line pulses epi0_en of the first source drive IC DIC 0 at the logical low-level during a second horizontal period corresponding to the second pixel row line 2. Then, during the second horizontal period, the image data for the second pixel row line 2 is transmitted to the first source drive IC DIC 0 through the EPI wiring pair (EPI_output).

Subsequently, the low power transmission driver 11 may control the line pulses epi0_en of the first source drive IC DIC 0 at the logical high-level during third to sixth horizontal period corresponding to the third to sixth pixel rows line3 to line6. Then, during the third to sixth horizontal period, the transmission of the image data to the first source drive IC DIC 0 is stopped.

In this case, the low power transmission driver 11 may output the signal DBDEN_0 having the logical high-level to disable the digital block 21 of the first source drive IC DIC 0 during the third to sixth horizontal period. The signal DBDEN_0 is output through the GPIO pin (GPIO), and transmitted to the DBDEN pin of the first source drive IC DIC 0. The DBDEN_0 signal may be generated having the logical high-level during the start horizontal period, i.e., the third horizontal period for disabling the first source drive IC DIC 0.

After the signal DBDEN_0 is converted to have the logical low-level, the timing controller 10 outputs only the clock training pattern to the EPI wiring pair, thereby waking up the first source drive IC DIC 0. Therefore, the woken-up first source drive IC DIC 0 may correctly receive the image data corresponding to the seventh pixel row line7 during the seventh horizontal period.

Figure 7:
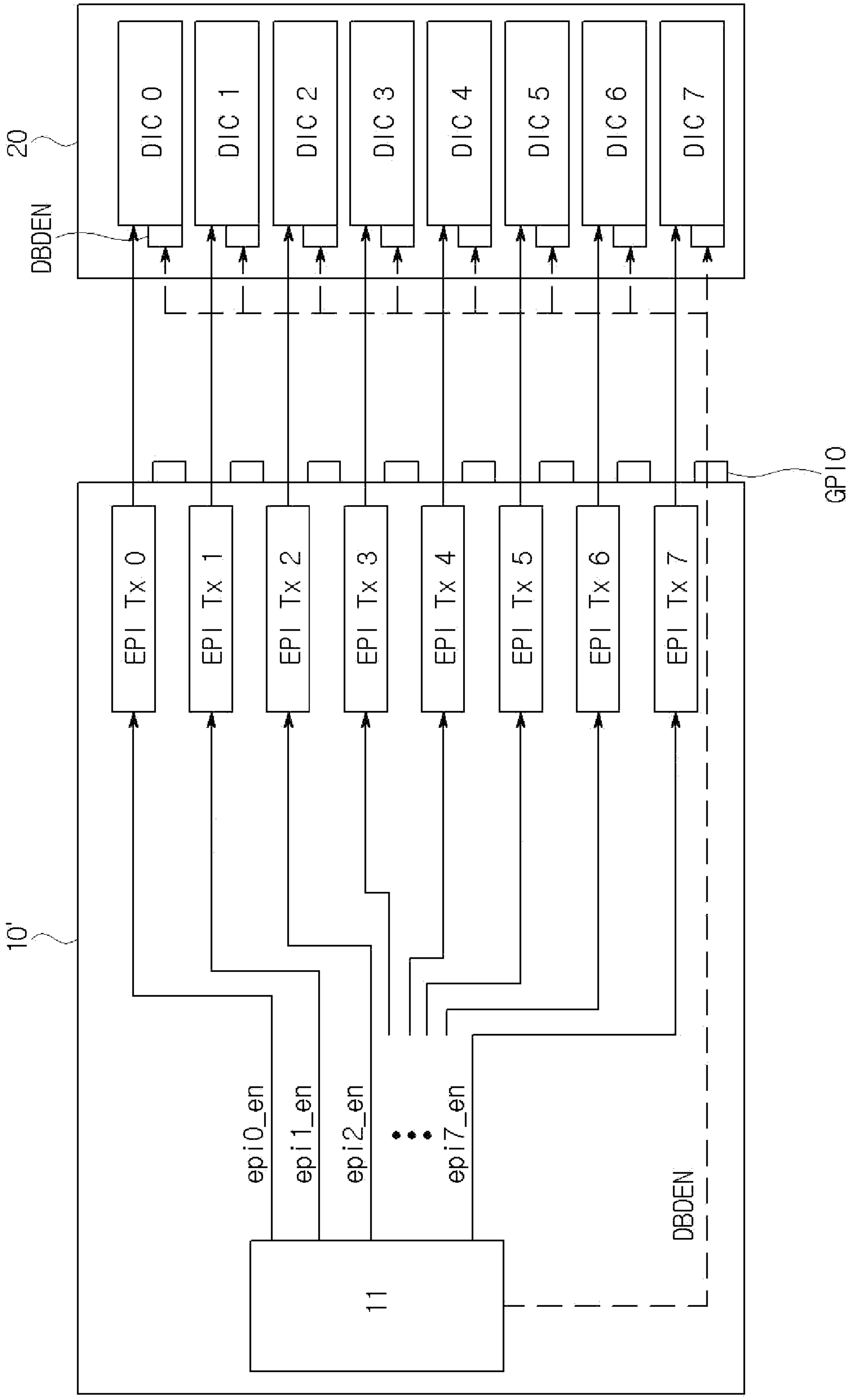
FIG. 7 illustrates an interface between a timing controller and a source drive IC according to another aspect of the present disclosure.

FIG. 7 illustrates an interface between a timing controller and a source drive IC according to another aspect of the present disclosure.

Referring to FIG. 7, the data driver 20 according to this aspect may include a predetermined number of source drive ICs, for example, eight source drive ICs DIC 0 to DIC 7.

The operations of a timing controller 10' are the same as those described above with reference to FIG. 5, and therefore detailed descriptions thereof will be omitted.

When the transmission is stopped for predetermined source drive ICs DIC 0 to DIC 7, the timing controller 10' may output the DBDEN signal DBDEN having the logical high-level through the GPIO pin. In this case, the DBDEN signal DBDEN may be transmitted to all the source drive ICs DIC 0 to DIC 7 connected to the GIPO pin. Therefore, to separately indicate the source drive ICs DIC 0 to DIC 7 of which the digital circuits will be disabled, the timing controller 10' may further transmit control information through the EPI wiring pair.

The control information for indicating the disability may be included in the control packet transmitted through the PI wiring pair. In this aspect, whether or not to disable the source drive ICs DIC 0 to DIC 7 may be indicated by 2-bit pseudo control data. For example, the disability for the source drive ICs DIC 0 to DIC 7 may be indicated by a value of '11'. Regarding the other source drive ICs DIC 0 to DIC 7 not to be disabled, the pseudo control data may have a value of '00', but is not limited thereto.

The source drive ICs DIC 0 to DIC 7 may be selectively disabled (i.e., operate in the sleep mode) based on the control information received through the EPI wiring pair and the DBDEN signal DBDEN received through the DBDEN pin. For example, when the DBDEN signal DBDEN having the logical high-level is received through the DBDEN pin, the source drive ICs DIC 0 to DIC 7 may be disabled in response to the pseudo control data having the value of '11' included in the control packet. The source drive ICs DIC 0 to DIC 7 that receive the pseudo control data having values other than '11' may remain enabled.

While the digital circuit 21 stops operating, the analog circuit 22 (shown in FIG. 3) may generate an analog data signal by reading the image data stored in the memory 23 (shown in FIG. 3) prior to the transmission stop, and output the analog data signal to the data line DL. The source drive ICs DIC 0 to DIC 7 may remain in the sleep mode until the clock training pattern is received through the EPI wiring pair, and wake up in response to the input of the clock training pattern.

In the illustrated aspect, the timing controller 10' includes one GPIO, which is connected point-to-multipoint to the DBDEN pins provided in the source drive ICs DIC 0 to DIC 7. In the aspect shown in FIG. 7, the number of pins required for the timing controller 10' is decreased, and the number of wirings for connecting the timing controller 10' and the source drive ICs DIC 0 to DIC 7 is also decreased, compared to those in the aspect shown in FIG. 5. Therefore, according to this aspect, the timing controller 10' is further miniaturized, a printed circuit board (PCB) is implemented narrowly, and the overall size and manufacturing costs of the display device 1 are reduced.

Figure 8:
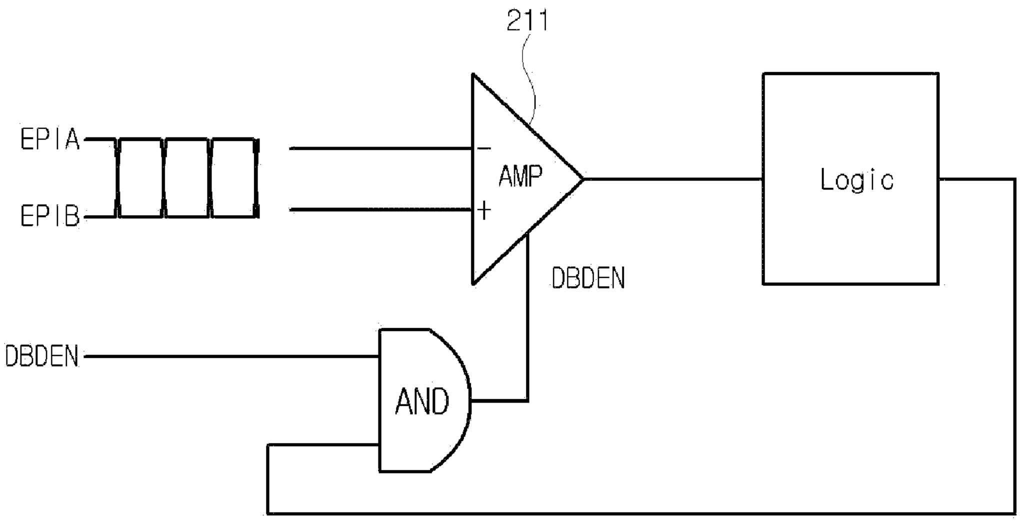
FIG. 8 is a logic circuit diagram more specifically showing a receiver of the source drive IC shown in FIG. 7.
Figure 9:
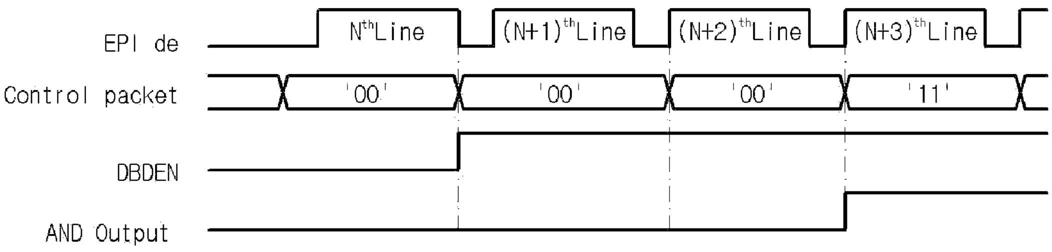
FIG. 9 is a timing diagram of signals generated by a timing controller and a source drive IC according to another aspect of the present disclosure.

FIG. 8 is a logic circuit diagram more specifically showing a receiver of the source drive IC shown in FIG. 7. Specifically, FIG. 8 shows the receiver 211 and the logic unit Logic connected to the EPI wiring pair of the source drive IC DIC. FIG. 9 is a timing diagram of signals generated by a timing controller and a source drive IC according to another aspect of the present disclosure.

Referring to both FIGS. 8 and 9, the receiver 211 of the source drive IC DIC may include an operational amplifier AMP. The operational amplifier AMP amplifies and outputs two input signals. The operational amplifier AMP may include an inverting input terminal (−) and a non-inverting input terminal (+) respectively connected to the wirings of the EPI wiring pair. For example, the operational amplifier AMP may be a differential amplifier that performs a differential amplification function for the input signal of the EPI wiring pair. The receiver 211 may, as shown in FIG. 9, receive a control packet in sync with the data enable signal EPI de that indicates a point in time when the source drive IC DIC is to output the image data of each pixel row.

The logic unit Logic may process a signal output from the operational amplifier AMP of the receiver 211, and generate the data signal. The logic unit Logic may include the serial-parallel converter 2111 (shown in FIG. 4) connected to the receiver 211 to convert a digital packet serially received through the receiver 211 into a parallel packet and output the parallel packet. Further, the logic unit Logic may include the register 212, the latch 213, the digital-to-analog converter 215, and the output buffer 216, as shown in FIG. 4.

The logic unit Logic may process the data packet and the control packet received through the receiver 211. The logic unit Logic may generate the data signal based on the image data included in the data packet, and perform an operation for controlling the source drive IC DIC based on the control information included in the control packet.

When the control information indicates disability, the logic unit Logic may be configured to output a logic signal corresponding to the control information. For example, when the pseudo control data of the control packet is '11', the logic unit Logic may output the logic high signal.

The source drive IC DIC further includes the DBDEN pin. Through the DBDEN pin, the DBDEN signal for disabling the source drive ID DIC may be received.

According to an aspect, the source drive IC DIC may further include a logic gate. The logic gate may, for example, be an AND gate AND. The AND gate AND may be connected to the DBDEN pin and an output of the logic unit Logic. The AND gate AND may output the logic high signal when receiving the same logic high signal from the DBDEN pin and the logic unit Logic.

For example, when the DBDEN signal having the logical high-level for disabling the source drive IC DIC is input to the DBDEN pin, and the logic high signal is output from the logic unit Logic based on the control packet, the AND gate AND may output the logic high signal.

The output of the AND gate AND is provided to the operational amplifier AMP. The output of the AND gate AND may be a driving voltage for the operational amplifier AMP. For example, the operational amplifier AMP is enabled when receiving the logic low signal from the AND gate AND to process the signals received through the EPI wiring pair, and disabled when receiving the logic high signal to stop a reception operation using the EPI wiring pair.

As described above, the display device 1 according to an aspect transmits a DBDEN signal to the plurality of source drive ICs DIC 0 to DIC 7 through the single GPIO pin, in which the receivers of the source drive ICs DIC 0 to DIC 7 include the AND gates AND so that the control packets may individually indicate whether or not to disable the source drive ICs DIC 0 to DIC 7.

The display device according to an aspect disables the digital circuit of the source drive IC in the LPTD mode, thereby further reducing power consumption.

The display device according to an aspect includes a minimal number of output pins of the timing controller to control the LPTD, thereby reducing manufacturing costs and implementing a narrow PCB.

Although aspects of the disclosure have been described above with reference to the accompanying drawings, it will be understood by those skilled in the art to which the disclosure pertains that the disclosure may be embodied in other specific forms without departing from the technical spirits or essential features of the disclosure. It should be therefore understood that the aspects described above are illustrative in all aspects and not limited. In addition, the scope of the disclosure is defined by the appended claims rather than by the foregoing detailed description. Further, all modifications or variations derived from the meaning and scope of the appended claims and their equivalents should be construed as falling into the scope of the disclosure.

What is claimed is:

1. A display device comprising:

a display panel including a plurality of pixel rows and a plurality of pixel columns arranged to display an image;

a data driver comprising a plurality of source drive integrated circuits (ICs) respectively connected to one or more pixel columns among the plurality of pixel columns and configured to supply a data signal to the plurality of pixel rows; and a timing controller configured to supply image data and a data control signal to the data driver, wherein the timing controller includes a general purpose input-output (GPIO) pin connected to digital block power down enable (DBDEN) pins provided in each of the plurality of source drive ICs in a point-to-multipoint way and outputs a DBDEN signal disabling to at least some of the plurality of source drive ICs, wherein each of the plurality of source drive IC comprises:

a receiver connected to an interface wiring pair and receiving a control packet and a data packet from the timing controller;

a logic unit configured to process the control packet and the data packet; and a logic gate connected to the DBDEN pin and an output of the logic unit, and configured to operate and output a DBDEN signal and an output signal of the logic unit to the receiver.

2. The display device of claim 1, wherein the timing controller transmits the control packet indicating whether to disable the source drive ICs through the interface wiring pair connected to the data driver upon the DBDEN signal enabled.

3. The display device of claim 2, wherein the plurality of source drive ICs is selectively disabled based on 2-bit pseudo control data included in the control packet and the DBDEN signal.

4. The display device of claim 1, wherein the logic unit is configured to output a logic high signal to stop operating the receiver upon the control packet indicating disability.

5. The display device of claim 4, wherein the logic gate outputs a logic high signal upon the DBDEN signal of a logical high-level supplied to the DBDEN pin and the logic high signal output from the logic unit.

6. The display device of claim 5, wherein the receiver comprises an operational amplifier configured to receive an output of the logic gate as a driving voltage, and amplify and output an input signal of the interface wiring pair.

7. The display device of claim 6, wherein the operational amplifier is disabled and stops the output upon the logic high signal received from the logic gate.

8. The display device of claim 1, wherein the logic unit comprises:

a digital circuit configured to perform a digital logic function required for driving the display panel; and an analog circuit configured to generate an analog output based on an output of the digital circuit.

9. The display device of claim 8, wherein the logic unit disables the digital circuit upon the control packet indicating the disability.

10. The display device of claim 1, wherein the timing controller is configured to disable the source drive IC connected to the pixel column comprising two or more pixel rows by outputting the DBDEN signal to the plurality of source drive ICs, upon the two or more pixel rows displaying a same grayscale.

11. The display device of claim 10, wherein the timing controller is configured to transmit the control packet for indicating disability to the source drive IC connected to the pixel column comprising the two or more pixel rows through the interface wiring pair.

12. A display device comprising:

a display panel comprising a plurality of pixel rows and a plurality of pixel columns arranged to display an image;

a plurality of source drive integrated circuits (ICs) respectively connected to one or more pixel columns and configured to supply a data signal to the pixel rows; and a timing controller configured to disable at least one source drive ICs connected to two or more pixel rows upon the two or more pixel rows displaying a same grayscale, wherein the timing controller transmits a control packet for indicating the at least one source drive ICs to be disabled and a digital block power down enable (DBDEN) signal to the plurality of source drive ICs upon the at least one source drive ICs being disabled, wherein each of the plurality of source drive IC comprises:

a receiver connected to an interface wiring pair and receiving the control packet and a data packet from the timing controller;

a logic unit configured to process the control packet and the data packet; and a logic gate connected to the DBDEN pin and an output of the logic unit, and configured to operate and output a DBDEN signal and an output signal of the logic unit to the receiver.

13. The display device of claim 12, wherein the control packet comprises 2-bit pseudo control data indicating whether each of the plurality of source drive ICs is disabled.

14. The display device of claim 13, wherein the control packet comprises a value of '11' for the at least one source drive IC to be disabled, and a value of '00' for remaining source drive ICs.

15. The display device of claim 13, wherein a disability of the plurality of source drive ICs is determined based on the 2-bit pseudo control data included in the control packet upon receiving the DBDEN signal.

16. The display device of claim 15, wherein the plurality of source drive ICs comprises:

a digital circuit configured to perform a digital logic function required for driving the display panel; and an analog circuit configured to generate an analog output based on an output of the digital circuit, wherein the digital circuit is disabled based on the control data.

17. The display device of claim 12, wherein the timing controller is connected to each of the plurality of source drive ICs through an interface wiring pair, and wherein the timing controller is connected to DBDEN pins provided in the plurality of source drive ICs in a point-to-multipoint way through a general purpose input-output (GPIO) pin.

18. The display device of claim 17, wherein the DBDEN signal is output through the GPIO pin, and the control packet is output through the interface wiring pair.

* * * * *